Patented July 20, 1954

2,684,341

UNITED STATES PATENT OFFICE 2,684,341

α-CHLOROACRYLIC ACID ESTER POLYMER FOAM

Harry D. Anspon, Easton, and Frank E. Pschorr, Tatamy, Pa., assignors to General Aniline & Film Corporation, New York, N. Y., a corporation of Delaware No Drawing. Application February 3, 1951, Serial No. 209,330

14 Claims. (Cl. 260—2.5)

This invention relates to the preparation of polymer foam from polymeric esters of α-chloroacrylic acid, and to the polymer foam produced thereby.

It is an object of this invention to provide masses of plastic foam from polymers and copolymers of esters of α-chloroacrylic acid, and to provide a process for preparing such masses.

Masses of polymer foam have been produced heretofore from natural polymers such as rubber, as well as synthetic elastomers and synthetic resins, such as polystyrene or polymethyl methacrylate, by inclusion in a mass of the polymer (or in an intermediate polymer composition adapted to yield the final polymer on heating) of a compound adapted to generate a gas at temperatures at which the mass is plastic, and heating the mass at gas-generating temperatures to form a plastic foam. Inclusion in the polymers of gas-generating compounds (also called "blowing agents"), while satisfactory for some purposes, is subject to a number of disadvantages. Thus, the blowing agents tend to discolor the polymer, and to lower its softening point, strength and rigidity. Many of the blowing agents heretofore employed are costly, and are inconvenient or dangerous to handle or prepare because of their instability, toxicity, or the toxicity of their intermediates.

It is known that numerous polymers and polymeric materials will generate gas spontaneously on heating at decomposition temperatures, whereby masses of foam are produced, but such procedures are generally regarded as undesirable because of deterioration of the polymer. Thus, foam-forming decomposition is usually accompanied by changes in the polymer structure, such as an increase in cross-linking of polymer chains which renders the polymer brittle and insoluble in organic solvents. In some cases, depolymerization or other decomposition reactions occur, impairing the tensile strength, rigidity or firmness of the polymer.

We have discovered that polymers and copolymers of esters of α-chloroacrylic acid with lower monohydroxy hydrocarbons (i. e., alcohols of 1 to 6 carbon atoms and phenol), in partly or fully polymerized state, can be converted to a polymer foam without addition of foreign gas-generating agents and without impairing the desirable properties of the polymers, by heating at a temperature within the range of 135 to 225° C. at which decomposition occurs and at which the polymer is in plastic condition.

The polymer foam produced under these conditions has numerous advantageous properties. Thus, it was found that the foam mass produced from colorless methyl α-chloroacrylate polymers remained colorless, odorless and tasteless after foam-forming treatment in accordance with this invention. The strength and impact-resistance of the foam mass is similar to or greater than that of the original solid polymer. At room temperatures, the foam is rigid, but on heating (e. g. to about 150 to 160° C.) the mass can be readily molded or shaped under pressure. Sheets of the resulting polymer foam, while not transparent, are unusually translucent. In addition, the polymer foam is characterized by excellent heat insulating properties. While the foam will burn if held in a flame, it is nevertheless self-extinguishing when the flame is removed. The density of the mass can be varied widely by controlling the extent of bubble formation. In this way, it is possible to provide masses of great buoyancy when immersed in water. Despite the decomposition occurring in the formation of the foam, the polymer is not appreciably cross-linked by the foam-forming heat treatment of the invention, and consequently, remains thermoplastic and soluble in organic solvents. The mechanical working properties of the foam are excellent; for example, when a nail is driven through the foam, it forms a clean hole which can be threaded without splitting the surrounding mass, and masses of the polymer foam can be machined in a lathe at high cutting speed without tendency to gum (as occurs with methyl methacrylate and styrene polymers) or to chip (as in the case of highly cross-linked polymers).

The polymer foam masses of this invention are prepared by heating a mass of a normally solid polymeric α-chloroacrylic acid ester of a monohydroxy hydrocarbon of 1 to 6 carbon atoms (i. e., a polymer which is solid at 20 to 30° C.) at a temperature within the range of 135 to 225° C., for a time sufficient to decompose the polymer with liberation of gas, but insufficient to permit bubbles to escape appreciably from the mass or to merge substantially within the mass, optimum results being obtained by heating for periods decreasing, with increasing temperatures, from several hours to 1 to 2 minutes, within the aforesaid temperature range. After foam formation has occurred, the mass is cooled to obtain a solid mass of polymer foam.

Heating can be conveniently effected by immersing the polymer in an inert high boiling liquid having no dissolving action on the polymer, and heating at the required temperature.

However, the heat can be supplied to the polymer in any appropriate manner, as by means of a hot vapor, by conduction from solid surfaces, or by irradiation with infrared rays. The preferred temperature range for preparing the polymer foam of this invention is 150 to 180° C. for periods ranging from 10 hours to one-half hour.

The size and rapidity of formation of gas bubbles in the polymer mass can be controlled by employing higher or lower temperatures within the aforesaid range. The temperature at any given time for producing a given rate of bubble formation and bubbles of a given maximum size varies to some extent, depending on the size of the polymer molecules. Thus, polymers of relatively lower molecular weight are best heated at lower temperatures within the aforesaid range to prevent escape of the bubble-forming gas, while higher molecular weight polymers can be heated at higher temperatures.

When intermediate or incompletely polymerized α-chloroacrylic acid esters of lower monohydroxy hydrocarbons are subjected to heat treatment in accordance with this invention, the required decomposition temperatures within the aforesaid range are often attained while maintaining the surrounding heating medium at a somewhat lower temperature because of heat liberated by simultaneous polymerization.

Polymeric esters of α-chloroacrylic acid which can be converted to polymer foam in accordance with this invention comprise alkyl, cycloalkyl and aryl esters containing 1 to 6 carbon atoms in the esterifying alcohol radical such as methyl, ethyl, propyl, butyl, hexyl, cyclohexyl and phenyl esters. Preferably, polymeric methyl α-chloroacrylate is employed.

The process of forming masses of polymer foam in accordance with this invention is illustrated by the following examples:

Example 1

A cast sheet of clear, colorless, mass-polymerized methyl α-chloroacrylate, 2.5 inches square and 0.25 inch thick was immersed in an inert high-boiling liquid heat medium (an oily hydrocarbon siloxane polymer such as DC-550 silicone oil, i. e., a methyl phenyl siloxane polymer) maintained at 160° C. for five successive periods of one-half hour each, the polymer being allowed to cool between the heating periods. A slight haze was noticeable at the end of the second half-hour heating period, and thereafter bubbles appeared which grew in size to about 1 mm. in diameter. At the end of the fifth period, the volume of the sample had expanded to about twice its original volume.

Example 2

A rectangular piece of cast mass polymerized methyl α-chloroacrylate about 2.1″ x 0.5″ x 0.25″ was immersed in the silicone oil bath of the preceding example, maintained at 170° C. At the end of one-half hour, bubble formation had begun, and at the end of one hour the sample was cooled to room temperature. It was found to consist of a mass of bubbles, and had expanded to 4.75″ x 1.37″ x 0.62″, or about 15 times its original volume. The sample was again immersed in the heated oil bath at the same temperature and after remaining therein for 23 minutes, it was noticed that some of the bubbles had begun to burst and escape. The sample was then allowed to cool and again measured. The largest bubbles on the surface had attained a size of 3 to 5 mm., while the dimensions of the sample had increased to 5.25″ x 1.5″ x 0.75″, or about 22 times its original volume.

Upon immersing the sample in the oil bath maintained at a temperature of 160° C., it was found that the sample could be readily bent into any desired shape.

Example 3

To purified monomeric methyl α-chloroacrylate, there was added 0.05% of its weight of silicone oil type DC-550 to prevent adhesion to a glass mold of the corresponding polymer, and 0.05% of its weight of ditertiary butyl peroxide to serve as a polymerization catalyst. The monomer was poured into a glass casting mold and the latter sealed to exclude air. The mold was heated in an oven maintained at 60° C. for 64 hours whereby a solid but incompletely polymerized mass polymer was formed. The oven temperature was then increased to 115° C. over a period of one hour and ten minutes. Further polymerization proceeded during this period with evolution of heat, whereby decomposition temperatures were attained and the polymer was converted to a foam having about 6 times its original volume.

Example 4

A sample of cast mass polymerized methyl-α-chloroacrylate one-eighth inch thick was immersed in the silicone oil bath of the type employed in the preceding examples, maintained at a temperature of 200° C. for 7 minutes, then removed and allowed to cool. The sample was converted to a mass of colorless polymer foam approximately five-sixteenths inch thick, with bubbles having a maximum diameter of about 2 mm.

In the case of a second sample, heated in the same manner and at the same temperature for one-half hour and then cooled, a considerable proportion of the bubbles had escaped or merged, and slight discoloration became apparent. The sample was no longer a light foam of the type produced at the end of 7 minutes.

Example 5

A sample of cast mass polymerized methyl-α-chloroacrylate one-eighth inch thick was heated in the same manner as in the preceding example, except that the temperature of the bath was 223 to 224.5° C. Bubble formation began 1.25 minutes after immersion in the bath, and after 1.7 minutes, it was removed from the bath and cooled. The sample had been converted to a colorless foam of similar appearance and dimensions to the product obtained in the first procedure of Example 4.

Each of the masses of polymer foam produced in the foregoing examples was colorless, tasteless and odorless, and possessed excellent impact resistance, strength and rigidity. The samples were also buoyant when immersed in water, the original polymer having a specific gravity of 1.45 and the masses of foam having a specific gravity considerably less than 1. Portions of the samples produced in the examples were broken into small pieces of about one-eighth inch average cross-sectional dimensions, and the particles immersed in water. Despite prolonged immersion, the particles failed to lose their buoyancy to any appreciable extent. While the samples dispersed light, they were found to be highly translucent.

The polymer foam of the examples ignited on holding it in a flame, but upon removal from the flame, the mass was found to be self-extinguishing. As distinguished from the original polymer, which shatters upon attempting to drive a nail through it, the polymer foam of Example 1 was readily pierced by nails, forming clean holes without splitting or injury to the polymer. A machine screw and a wood screw were threaded through the resulting holes and found to hold firmly therein without injury to the polymer mass. The polymer foam of Example 1 was readily machined on a lathe, even at high speed, without tendency to gum or to chip.

The composition of the polymer foam produced in accordance with this invention is not known. In view of persistent thermoplasticity and solubility in organic solvents such as methylene chloride, it appears that the thermal decomposition occurring during foaming reaction does not result in substantial cross-linking of the polymer chains. It was found that the gases evolved during foam formation by methyl α-chloroacrylate polymer consist of methyl chloride accompanied by a relatively small proportion of HCl. While it is not desired to limit the composition of the foam by any theory, it appears probable that the principal decomposition reaction involves elimination of esterifying methyl groups together with adjacent substituent chlorine atoms, resulting in formation of lactone units in the polymer chains, possibly as illustrated in the following equation:

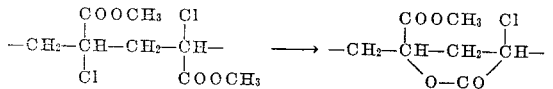

Surprisingly, despite the possibility of formation of cross-linkages between polymer chains by elimination of methyl chloride, no substantial cross-linking appears to occur.

The thermal treatment of this invention can be applied not only to normally solid polymers of α-chloroacrylic esters produced by casting or mass polymerization, but also to normally solid polymers in the form of particles or granules produced by emulsion polymerization or granular polymerization of a dispersion of the monomer in an immiscible liquid medium. The polymer in this form is converted to foam by suspending it in an inert liquid such as the silicone oil of Examples 1 and 2, and subjecting it therein to heat treatment in the same manner as described in the examples. The resulting foam particles or beads are useful for insulating packing, soundproofing and reflecting surfaces on cinema screens.

A coherent mass of such particles can be produced by mixing the foam particles with a polymerizable resin intermediate, e. g. monomeric methyl α-chloroacrylate, styrene or methyl methacrylate, and polymerizing the resulting mass in a mold.

The polymeric α-chloroacrylate esters subjected to heat treatment as described in the examples need not be produced by mass polymerization or casting of the monomer, but can be made by molding the powdered polymer under heat and pressure, sufficient, if desired, to form a transparent product. The polymer foam can be produced in sheet form by evaporating an aqueous solution of the polymeric ester to form a film, and subjecting the film to thermal foam-forming treatment in accordance with this invention.

To increase the number of nuclei for bubble formation, inert finely dispersed solids, such as silica gel, bentonite or aluminum oxide, and/or heat responsive gas generating agents, particularly dissolved ingredients such as methanol, which are readily volatile at the temperature of thermal treatment, or "blowing agents" such as azo-bis-isobutyronitrile, can be incorporated in the polymer (e. g. by addition to the corresponding ester monomer before polymerization, and polymerizing), the product obtained then being heat-treated as edscribed above to cause formation of foam.

The number of bubble nuclei can also be increased by carrying out thermal treatment in accordance with this invention in successive stages as illustrated in Example 1, involving repeatedly heating the polymer to a stage of incipient bubble formation, and cooling after each heat treatment. A plasticizer can be included in the polymerized ester subjected to the treatment of the invention to produce polymer foam of increased flexibility.

Molded masses of plastic foam produced in accordance with this invention can be made by placing a shaped sheet or molding powder of the polymer in an oversized mold and heating it therein until the resulting foam fills the mold. By cooling the foam under pressure, a smooth-surfaced mass of polymer foam can be obtained in this manner.

The polymer foam of this invention can also be produced by thermal treatment, as described above, of polymers containing α-chloroacrylic ester units of the type mentioned above either in physical or chemical combination with other polymers. For example, granular polymers of the aforesaid α-chloroacrylic esters can be mixed with other polymers such as polystyrene, polymethyl methacrylate, polyvinyl chloride, polyvinylidene chloride or the like, in granular form, and the mixture subjected to heat treatment as described above to cause bubble formation by decomposition of the α-chloroacrylic ester polymer. The α-chloroacrylic ester polymer can thus serve in effect as a "blowing agent" in admixture with other polymers. Similarly, the granular α-chloroacrylic ester polymer can be suspended in a different polymerizable medium, and after polymerization of the latter, the mass can be subjected to the heat treatment of this invention, causing liberation of gas by the α-chloroacrylic ester polymer. Instead of admixing preformed polymerized α-chloroacrylic esters with other polymerized or polymerizable materials, the monomeric α-chloroacrylic ester can be combined with a copolymerizable monomer such as methyl methacrylate and the copolymer subjected to the heat treatment of the invention to convert the mass into a foam by liberation of gas from the α-chloroacrylic ester units of the polymer chain.

Polymer foam produced in accordance with the invention is useful in building construction as an insulating agent against heat, sound and moisture. Thus, the polymer foam can be used in the form of sheets for roofing, shingling, soundproofing and the like. Since it is translucent, it can be used for a translucent window material for skylights and greenhouse coverings, and as a diffusion medium in lamps and other lighting accessories. It is also suitable for coating white-light reflecting surfaces such as cinema projection screens. Its thermoplastic properties permit it to be molded to any desired shape with heat and pressure. The ease of mechanical working permits it to be sawed, nailed, threaded, or machined in a lathe. The high tensile strength of the product and its impact resistance and rigidity at atmospheric temperatures permits its substitution for conventional materials heretofore employed, while its self-extinguishing properties render it safe from the standpoint of fire hazards. A dispersion of polymer foam particles produced by the invention in a varnish or lacquer which is a non-solvent for the polymer, can be used for forming insulating layers against heat and sound. The heat-insulating qualities of the polymer foam and its machine strength and impact-resistance render it useful not only for insulating layers and sheets in building construction, but also in automobile bodies, aircraft fuselages and wings, refrigerators, food containers and serving equipment, and protective insulating casings for thermos bottles, flasks and glassware.

In airplane construction, the polymer foam is also suitable for fuel tanks, since it yields a clean hole when pierced by an external object, readily sealed by the self-sealing layers of the tank. It can also be used as a filler for translucent radomes enclosing the radar antenna. Its high strength and low density adapt it as a core filler for high-speed airplane propellers in which it withstands the high centrifugal force developed in the propeller without displacement.

The buoyancy and waterproof qualities of the polymer foam render it useful for floating toys, surfboards, fishing equipment, life preservers, and pontoons for aircraft and other floating devices. It is also useful for a protective layer in sports equipment such as shoulder pads, helmets and shin guards.

The process of this invention can be applied for decorating and copying by exposing a continuous layer of the polymeric α-chloroacrylic ester to heat (e. g. infrared rays) under an opaque pattern such as a stencil or photographic positive serving as a mask, whereby the polymer is heated locally to cause foam formation only in the exposed portions in accordance with the pattern of the original, thereby reproducing the design in translucent raised portions on its surface. By inclusion of pigments or dyestuffs, the background corresponding to the masked portions can be made to appear in any desired color, the coloration appearing denser in the foamed portions. The mask can be produced on the surface of the polymer by photographic processes, e. g. by application, exposure and development of a silver-halide light-sensitive layer, or of a diazotype layer including, for example, a light or heat-sensitive diazo component and an azo coupling component yielding a coloration on development with an alkaline-reacting solution or vapor.

Other variations and modifications which will be obvious to those skilled in the art may be made in the foregoing specific procedures without departing from the scope or spirit of the invention.

We claim:

1. A process for making plastic foam, which comprises heating a normally solid polymer of an α-chloroacrylic acid ester of a monohydroxy hydrocarbon of 1 to 6 carbon atoms at a decomposition temperature within the range of 135° to 225° C. until gas bubbles are generated within the mass, and cooling below said temperature range before a substantial proportion of the bubbles merge within the mass or escape from the surface thereof.

2. A process for making plastic foam, which comprises heating a normally solid polymer of an α-chloroacrylic acid ester of a monohydric alcohol of 1 to 6 carbon atoms at a temperature from 150° to 180° C. until gas bubbles are generated within the mass, and cooling below said temperature range before a substantial proportion of the bubbles merge within the mass or escape from the surface thereof.

3. A process for making plastic foam, which comprises heating a normally solid polymer of methyl α-chloroacrylate at a temperature from 150° to 180° C. for a period ranging from 10 hours to one-half hour, and cooling below said temperature range before a substantial proportion of the bubbles merge within the mass or escape from the surface thereof.

4. A process for making shaped plastic foam masses, which comprises heating a normally solid polymer of an α-chloroacrylic acid ester of a monohydroxy hydrocarbon of 1 to 6 carbon atoms at a decomposition temperature within the range of 135° to 225° C. until gas bubbles are generated within the mass, molding the resulting foam mass within the aforesaid temperature range, and cooling to solidify the foam in the desired shape before a substantial proportion of the bubbles merge within the mass or escape from the surface thereof.

5. A process for making plastic foam particles, which comprises heating a dispersion of a normally solid polymer of an α-chloroacrylic acid ester of a monohydroxy hydrocarbon of 1 to 6 carbon atoms in an inert non-solvent liquid suspension medium at a decomposition temperature within the range of 135° to 225° C. until gas bubbles are formed within the particles, cooling the suspension before a substantial proportion of the bubbles merge within the particles or escape therefrom, and separating the resulting polymer foam particles from the liquid suspension medium.

6. A process for making plastic foam, which comprises heating a normally solid polymer of an α-chloroacrylic acid ester of a monohydroxy hydrocarbon of 1 to 6 carbon atoms, having suspended therein an inert finely divided solid, at a decomposition temperature within the range of 135° to 225° C. until gas bubbles are generated within the mass, and cooling below said temperature range before a substantial proportion of the bubbles merge within the mass or escape from the surface thereof.

7. A process for making plastic foam, which comprises heating a normally solid polymer of an α-chloroacrylic acid ester of a monohydroxy hydrocarbon of 1 to 6 carbon atoms at a decomposition temperature within the range of 135° to 225° C., said polymer containing a heat-responsive gas-generating agent uniformly distributed therein and adapted to generate a gas at said decomposition temperature, and cooling below said temperature range before a substantial proportion of the bubbles merge within the mass or escape from the surface thereof.

8. A process for forming plastic foam, which comprises heating an incompletely polymerized but normally solid ester of α-chloroacrylic acid with a monohydroxy hydrocarbon of 1 to 6 carbon atoms at a decomposition temperature within the range of 135° to 225° C. to cause gas generation in the mass and complete its polymerization, and cooling the resulting plastic foam before a substantial proportion of the bubbles merge within the mass or escape from the surface thereof.

9. A process for making plastic foam, which comprises heating a normally solid homopolymer of an α-chloroacrylic acid ester of a monohydroxy hydrocarbon of 1 to 6 carbon atoms at a decomposition temperature within the range of 135° to 225° C. until gas bubbles are generated within the mass, and cooling below said temperature range before a substantial proportion of the bubbles merge within the mass or escape from the surface thereof.

10. A process for making plastic foam, which comprises heating a normally solid copolymer of an α-chloroacrylic acid ester of a monohydroxy hydrocarbon of 1 to 6 carbon atoms with an olefinic monomer copolymerizable with said α-chloroacrylic acid ester by addition polymerization, at a temperature within the range of 135° to 225° C., until gas bubbles are generated within the mass, and cooling below said temperature range before a substantial proportion of the bubbles merge within the mass or escape from the surface thereof.

11. Plastic foam consisting of a heat treated solid polymer of an α-chloroacrylic acid ester of a monohydroxy hydrocarbon of 1 to 6 carbon atoms, in which the bubbles contain the normally gaseous thermal autodecomposition products of this polymer.

12. Plastic foam as defined in claim 11, wherein the polymer is a homopolymer of said ester.

13. Plastic foam as defined in claim 11, wherein the polymer is a copolymer of said ester with an olefinic monomer copolymerized with said ester by addition polymerization.

14. Plastic foam consisting of a mass of heat treated solid polymeric methyl α-chloroacrylate in which the bubbles consist essentially of normally gaseous thermal autodecomposition products of said polymer.

References Cited in the file of this patent

Marvel et al.: Journal of The American Chemical Society, No. 1939, vol. 61, page 3159.